United States Patent [19]

Burns

[11] Patent Number: 5,375,456

[45] Date of Patent: Dec. 27, 1994

[54] LEAK TESTING APPARATUS AND METHOD

[75] Inventor: William Burns, Rochester Hills, Mich.

[73] Assignee: TRW Vehicle Safety Systems Inc., Lyndhurst, Ohio

[21] Appl. No.: 154,176

[22] Filed: Nov. 18, 1993

[51] Int. Cl.$^5$ .............................................. G01M 3/20
[52] U.S. Cl. ...................................................... 73/40.7
[58] Field of Search ........................ 73/40.7, 49.3, 52

[56] References Cited

U.S. PATENT DOCUMENTS

| | | | |
|---|---|---|---|
| 4,419,882 | 12/1983 | Ishii et al. | 73/40.7 |
| 4,492,110 | 9/1985 | Bergquist | 73/40.7 |
| 4,499,752 | 2/1985 | Fruzzetti et al. | 73/40.7 |
| 4,920,785 | 5/1990 | Etess | 73/49.3 X |

FOREIGN PATENT DOCUMENTS

| | | | |
|---|---|---|---|
| 2458137 | 6/1976 | Germany | 73/49.3 |
| 877379 | 10/1981 | U.S.S.R. | 73/40.7 |
| 1619085 | 1/1991 | U.S.S.R. | 73/40.7 |

*Primary Examiner*—Hezron E. Williams
*Assistant Examiner*—Joseph W. Roskos
*Attorney, Agent, or Firm*—Tarolli, Sundheim & Covell

[57] ABSTRACT

An apparatus 10 for testing seal integrity includes a test chamber 24 for receiving a sealed article 12 containing a tracer fluid, a reservoir chamber 44, and an analysis instrument 20 for detecting the presence of tracer fluid leaked from the article 12. A reservoir valve 64 in a conduit 58 coupled between the reservoir chamber 44 and the analysis instrument 20 has an open position for enabling a vacuum to be created in the reservoir chamber 44 using the analysis instrument 20. When closed, the reservoir valve 64 blocks fluid communication between the reservoir chamber 44 and the analysis instrument 20 to isolate the vacuum in the reservoir chamber 44. A valve 48 in a conduit 38 coupled between the test chamber 24 and the reservoir chamber 44 has a closed position for blocking fluid communication between the test chamber and the reservoir chamber. This prevents a pressure change in the test chamber 24 during creation of the vacuum in the reservoir chamber 44. The valve 48 has an open position for enabling the isolated vacuum in the evacuated reservoir chamber 44 to be applied to the article 12 in the test chamber 24 to draw the tracer fluid out of the article 12 through any leakage paths. The contents of the test chamber, including any leaked tracer fluid, are then conveyed to the analysis instrument.

18 Claims, 1 Drawing Sheet

LEAK TESTING APPARATUS AND METHOD

FIELD OF THE INVENTION

The present invention relates to an apparatus and a method for checking seal integrity of an article of manufacture by testing for the presence of an escaped tracer fluid, such as helium or argon, which was sealed within the article.

BACKGROUND OF THE INVENTION

A leak tester is used to detect the presence of a leak in a sealed article. Such a leak can render the article ineffective for its intended use.

In a known method, an article is sealed with a tracer gas, such as helium, in the article. The article is then placed in a chamber directly connected to a gas analysis instrument, such as a mass spectrometer. The mass spectrometer is capable of detecting the presence of the tracer gas. The mass spectrometer includes a vacuum pump which evacuates the chamber which encloses the article. If a leak is present in the article, the tracer gas will pass through the leak in the article into the mass spectrometer.

The known method requires a high vacuum for proper functioning of the mass spectrometer. During creation of the high vacuum, it is possible for most or all of a leaking tracer gas to be drawn from an article into the mass spectrometer and flow from the mass spectrometer. When the high vacuum is obtained, there may be an insufficient amount of leaked tracer gas flowing into the mass spectrometer to be detected. Thus, the mass spectrometer may indicate that the article is acceptable (no leaked tracer gas) when in fact the article is not acceptable.

SUMMARY OF THE INVENTION

The present invention provides an apparatus for checking seal integrity of an article which has a tracer fluid, such as helium or argon, contained within the article. The apparatus includes a test chamber for receiving the article. The apparatus also includes a reservoir chamber for retaining a vacuum and for receiving tracer fluid which leaks from the article. The apparatus includes an analysis instrument for detecting a presence of the tracer fluid. The analysis instrument includes a means for creating the vacuum in the reservoir chamber. The tracer fluid is preferably a gas and the analysis instrument is preferably a gas analysis instrument.

The apparatus further includes a first conduit coupled between the reservoir chamber and the analysis instrument. A first valve in the first conduit has an open position for permitting fluid communication between the reservoir chamber and the analysis instrument and for enabling a vacuum to be created in the reservoir chamber. The first valve has a closed position for blocking fluid communication through the first conduit between the reservoir chamber and the analysis instrument after a vacuum is created in the reservoir chamber.

The apparatus further includes a second conduit coupled between the test chamber and the reservoir chamber. A second valve in the second conduit has a closed position for blocking fluid communication between the test chamber and the reservoir chamber to prevent a pressure change in the test chamber during creation of the vacuum in the reservoir chamber. The second valve has an open position for enabling the vacuum from the evacuated reservoir chamber to be applied to the article in the test chamber to draw the tracer fluid out of the article through any leakage path in the article.

During use of the present invention, the test article is not subject to a vacuum prior to the analysis instrument achieving a sufficiently high operating vacuum. Moreover, any leakage of tracer fluid is contained within the test chamber and the reservoir chamber after the vacuum in the evacuated reservoir chamber is applied to the article. No leaked tracer fluid is vented to the atmosphere during creation of the high vacuum required for the analysis instrument to function.

The present invention further provides a method of checking seal integrity of an article having a tracer fluid, such as helium or argon, contained within the article. The method includes sealing the article in a first chamber to isolate the article. A required high operating vacuum is created in an analysis instrument. A vacuum is also created by the analysis instrument in a second chamber which is sealed from the first chamber such that the article is not subject to a pressure change during creation of the vacuum in the second chamber. The second chamber is sealed from the analysis instrument to retain the vacuum in the second chamber and to isolate the vacuum within the second chamber.

Thereafter, fluid communication is established between the first and second chambers, and the vacuum in the second chamber is applied to the article in the first chamber to draw the tracer fluid out of the article through any leakage path in the article. A fluid flow of any tracer fluid drawn from the article is established toward the analysis instrument. The fluid flow is analyzed by the analysis instrument to determine the presence of the tracer fluid. Thus, the article is not subject to a vacuum prior to the analysis instrument achieving a required high operating vacuum, and any leaked tracer fluid is not prematurely vented to the atmosphere.

DESCRIPTION OF THE DRAWING

The foregoing and other features of the present invention will become apparent to one skilled in the art to which the present invention relates upon consideration of the following description of the invention with reference to the accompanying drawing, wherein.

DESCRIPTION OF A PREFERRED EMBODIMENT

Figure 1:
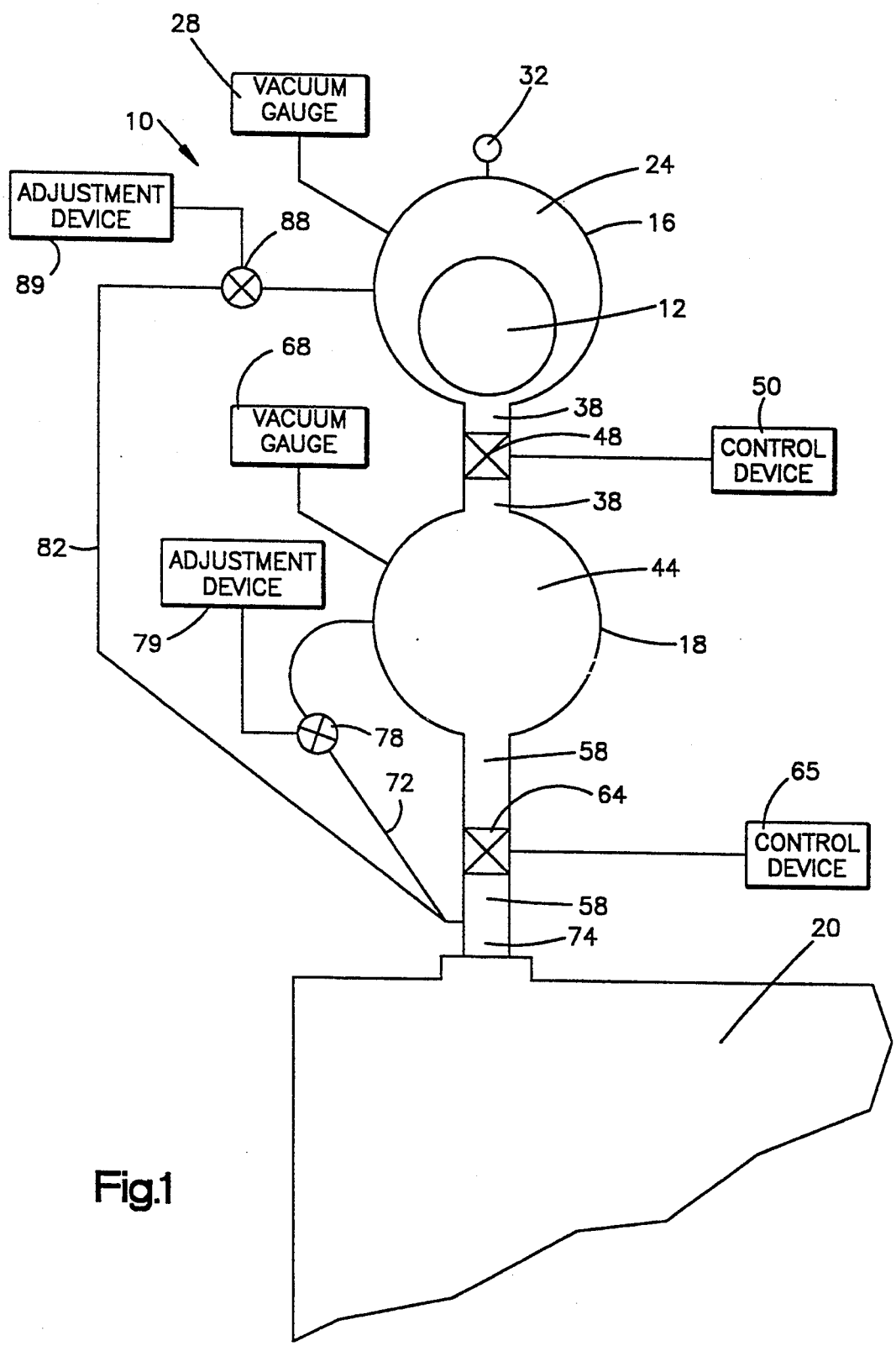
FIG. 1 is a schematic illustration of an apparatus embodying the present invention.

The present invention relates to an apparatus and method for checking seal integrity of an article by testing for the presence of an escaped tracer fluid, such as helium or argon gas, which was sealed within the article. As representative of the present invention, FIG. 1 illustrates a leak detector apparatus 10 for testing for the presence of an escaped tracer gas from a test article 12 which has the tracer gas sealed within the article 12. The leak detection apparatus 10 includes a test container 16, a reservoir container 18 and a gas analysis instrument 20.

The test container 16 defines a test chamber 24 for receiving the article 12. The test chamber 24 should only be large enough to provide for a minimum free volume after the article 12 is placed in the test chamber 24. The internal surface of the test container 16 is constructed from a highly polished, nonporous material so that the internal surface does not hold moisture and/or contaminants which may interfere with a vacuum condition in the test chamber 24. The test container 16 is preferably constructed from a stainless steel alloy, an aluminum alloy, glass, brass or the like.

The test container 16 has a test chamber vacuum gauge 28 connected with the test container 16. The vacuum gauge 28 indicates the pressure in the test chamber 24. A suitable vacuum gauge 28 is a Fisher Brand Thermocouple Vacuum Gauge, available from Fisher Scientific Co.; a 536 Thermocouple Gauge Tube available from Varian Associates Inc.; a Capacitance Diaphragm Gauge available from Varian Associates Inc.; a General Purpose Transducer CMLA, CMLB & CMLR Series available from Varian Associates Inc.; or a High Sensitivity Transducer CMOX series available from Varian Associates Inc.

The test container 16 has a bleed valve 32 connected with the test container 16. The bleed valve 32 has an open position and a closed position. When the bleed valve 32 is in the open position, the test chamber 24 is in fluid communication with the external atmosphere and the pressure in the test chamber 24 can be adjusted. When the bleed valve 32 is in the closed position, fluid communication is prevented between the test chamber 24 and the external atmosphere. A suitable bleed valve 32 is a TEFLON® capillary valve No. L-03235-00, L-03237-33 or L-03237-23 available from Cole Parmer Co.

The reservoir container 18 defines a reservoir chamber 44. The reservoir chamber 44 preferably has a volume about 100 times greater than the free volume which remains in the test chamber 24 when the test article 12 is located in the test chamber 24. The internal surface of reservoir container 18 is constructed from a highly polished, nonporous material, so that the internal surface does not hold moisture and/or contaminants which may interfere with a vacuum condition in the reservoir chamber 44. The reservoir container 18 is constructed from a stainless steel alloy, an aluminum alloy, glass, brass or the like.

The reservoir container 18 has a reservoir chamber vacuum gauge 68 connected with the reservoir container 18. The vacuum gauge 68 indicates the pressure in the reservoir chamber 44. The vacuum gauge 68 may be the same type of gauge as the test chamber vacuum gauge 28.

The gas analysis instrument 20 includes a vacuum device (not shown), such as a mechanical pump and a diffusion pump which establish a gas flow path through the gas analysis instrument 20. The vacuum device of the gas analysis instrument 20 has a capacity to produce a high vacuum in the range of 5 millitorr to 500 millitorr. In a preferred embodiment, the gas analysis instrument 20 is a mass spectrometer, although the gas analysis instrument could be an infrared spectrophotometer or an ion chromatograph. A suitable mass spectrometer is a VEECO MS 32T available from Veeco Instruments Inc.

The gas analysis instrument 20 may be tuned to detect virtually any gas. However, the tracer gas typically sealed in the test article 12 is helium. Helium is employed as the tracer gas because it is small in molecular size, light in weight and an inert element. Helium is highly diffusible, non-toxic and only present in trace quantities in the atmosphere.

The leak detection apparatus 10 also includes a test chamber conduit 38 and a reservoir chamber conduit 58. The test container 16 is coupled to the reservoir container 18 by the test chamber conduit 38. The test chamber conduit 38 connects the test chamber 24 with the reservoir chamber 44. The test chamber conduit 38 is preferably constructed from stainless steel alloy tubing, aluminum tubing or the like.

A test chamber valve 48 is disposed in the test chamber conduit 38. The test chamber valve 48 controls the fluid flow through the test chamber conduit 38. The test chamber valve 48 has an open position and a closed position. When the test chamber valve 48 is in the open position, the test chamber 24 is in fluid communication with the reservoir chamber 44 through the test chamber conduit 38. When the test chamber valve 48 is in the closed position, fluid communication is prevented between the test chamber 24 and the reservoir chamber 44 through the test chamber conduit 38. The test chamber valve 48 is capable of sealing a vacuum pressure of about $10^{-11}$ Torr and has a leak rate with a sensitivity of about $10^{-12}$ cc/sec. A suitable test chamber valve 48 is a Variable Leak Valve, available from Varian Associates, Inc., or an Aluminum Block Valve, Model No. NW16 1243-L6281-301, available from Varian Associates, Inc.

A control device 50 is connected with the test chamber valve 48 and controls the test chamber valve 48. The control device 50 moves the test chamber valve 48 between its open and closed positions. The control device 50 can be set to move the test chamber valve 48 to its closed position when a predetermined pressure in the test chamber 24 is achieved or after a predetermined evacuation time elapses for the test chamber 24. A suitable control device 50 is a Varian Multi-Gauge available from Varian Associates, Inc.

The reservoir container 18 is coupled to the gas analysis instrument 20 by the reservoir chamber conduit 58. The reservoir chamber conduit 58 connects the reservoir chamber 44 with the gas analysis instrument 20. The reservoir chamber conduit 58 is preferably constructed from stainless steel alloy tubing, aluminum alloy tubing or the like.

A reservoir valve 64 is disposed in the reservoir chamber conduit 58. The reservoir valve 64 controls the fluid flow through the reservoir chamber conduit 58. The reservoir valve 64 has an open position and a closed position. When the reservoir valve 64 is in the open position, fluid communication is permitted between the reservoir chamber 44 and the gas analysis instrument 20 through the reservoir chamber conduit 58. When the reservoir valve 64 is in the closed position, fluid communication is prevented between the reservoir chamber 44 and the gas analysis instrument 20 through the reservoir chamber conduit 58.

The reservoir valve 64 is capable of sealing a vacuum pressure of about $10^{-11}$ Torr and has a leak rate with a sensitivity of about $10^{-12}$ cc/sec. A suitable reservoir valve 64 is a Variable Leak Valve available from Varian Associates Inc. or an Aluminum Block Valve, Model No. NW16 1243-L6281-301, available from Varian Associates Inc.

A control device 65 is connected with the reservoir valve 64 for moving the reservoir valve 64 between its open and closed positions. The control device 65 can be set to move the reservoir valve 64 to its closed position when a predetermined pressure in the reservoir chamber 44 is achieved or after a predetermined evacuation time elapses for the reservoir chamber 44. A suitable control device 65 is a Varian Multi-Gauge available from Varian Associates, Inc.

In a preferred embodiment, the leak detection apparatus 10 also includes a reservoir restrictive conduit 72 and a test chamber restrictive conduit 82. The reservoir restrictive conduit 72 extends between the reservoir container 18 and an end portion 74 of the reservoir chamber conduit 58. The end portion 74 is located downstream of the reservoir valve 64 toward the gas analysis instrument 20. The reservoir restrictive conduit 72 can place the reservoir chamber 44 in fluid communication with the gas analysis instrument 20. The reservoir restrictive conduit 72 has a small cross-sectional flow area size to provide a resistance to a flow of gas through the reservoir restrictive conduit 72. The capacity of the vacuum device of the gas analysis instrument 20 is sufficiently high to maintain a vacuum pressure in the gas analysis instrument 20 below 200 millitorr while gas is flowing through the reservoir restrictive conduit 72 during a testing operation. The gas fluid flow rate in the reservoir restrictive conduit 72 caused by the vacuum device is generally about at least 45 cc/minute. Thus, the flow area size of the reservoir restrictive conduit 72 is chosen in view of the capacity of the vacuum device such that the ability of the reservoir restrictive conduit 72 to provide a flow of gas to the gas analysis instrument 20 is balanced against the ability of the vacuum device to evacuate the gas analysis instrument 20. The reservoir restrictive conduit 72 is typically a tubing such as stainless capillary tubing.

A reservoir capillary valve 78 is disposed in the reservoir restrictive conduit 72. The reservoir capillary valve 78 has an open position and a closed position. When the reservoir capillary valve 78 is in the open position, fluid communication is permitted between the reservoir chamber 44 and the gas analysis instrument 20 through the reservoir restrictive conduit 72. When the reservoir capillary valve 78 is in an open position, fluid flow between the reservoir chamber 44 and the gas analysis instrument 20 occurs without a significant rise in pressure in the gas analysis instrument 20, due to the relatively small amount of fluid flow which occurs. When the reservoir capillary valve 78 is in the closed position, fluid communication is prevented between the reservoir chamber 44 and the gas analysis instrument 20 through the reservoir restrictive conduit 72. A suitable reservoir capillary valve 78 is a micrometer valve such as a TEFLON ® capillary valve, Model No. L-03235-00, L-03237-33 or L-03237-23 available from Cole Parmer Co.

An adjustment device 79 is connected with the reservoir capillary valve 78 for controlling the reservoir capillary valve 78. The adjustment device 79 is manually controlled and actuates the capillary valve 78 between open and closed positions.

The test chamber restrictive conduit 82 extends between the test container 16 and the end portion 74 of the reservoir chamber conduit 58, downstream of the reservoir valve 64. The test chamber restrictive conduit 82 can place the test chamber 24 in fluid communication with the gas analysis instrument 20. The test chamber restrictive conduit 82 has a small cross-sectional flow area size to provide a resistance to a flow of gas through the test chamber restrictive conduit 82. The capacity of the vacuum device of the gas analysis instrument 20 is sufficiently high to maintain a vacuum pressure in the gas analysis instrument 20 below 200 millitorr while gas is flowing through the test chamber restrictive conduit 82 during a testing operation. The gas fluid flow rate in the test chamber restrictive conduit 82 caused by the vacuum device is generally about 45 cc/minute. Thus, the flow area size of the test chamber conduit 82 is chosen in view of the capacity of the vacuum device such that the ability of the test chamber restrictive conduit 82 to provide a flow of gas to the gas analysis instrument 20 is balanced against the ability of the vacuum device to evacuate the gas analysis instrument 20. The test chamber restrictive conduit 82 is typically a flexible material tubing such as stainless capillary tubing.

A test chamber capillary valve 88 is disposed along the test chamber restrictive conduit 82. The test chamber capillary valve 88 has an open position and a closed position. When the test chamber capillary valve 88 is in the open position, fluid communication is permitted between the test chamber 24 and the gas analysis instrument 20 through the test chamber restrictive conduit 82. When the test chamber capillary valve 88 is in the open position, fluid flow between the test chamber 24 and the gas analysis instrument 20 occurs without a significant rise in pressure in the gas analysis instrument 20 due to the relatively small amount of fluid flow which occurs. When the test chamber capillary valve 88 is in the closed position, fluid communication is prevented between the test chamber 24 and the gas analysis instrument 20 through the test chamber restrictive conduit 82. A suitable test chamber capillary valve 88 is a micrometer valve such as a TEFLON ® capillary valve, L-03235-00, L-03237-33 or L-03237-23 available from Cole Parmer Co.

An adjustment device 89 for controlling the test chamber capillary valve 88 is connected with the test chamber capillary valve 82. The adjustment device 89 is manually controlled and actuates the capillary valve 78 between open and closed positions.

In operation of the leak detector apparatus 10, the article 12 to be tested is placed in the test chamber 24 of the test container 16. The test chamber valve 48, the reservoir chamber valve 64, the reservoir capillary valve 78, the test chamber capillary valve 88, and the bleed valve 32 are placed in their respective closed positions. Thus, the article 12 is isolated within the test chamber 24 from exterior pressure changes. The gas analysis instrument 20 is turned on and set to detect the specific tracer gas, i.e. helium, sealed within the article 12.

The reservoir valve 64 is opened by the control device 65. The reservoir chamber 44 is evacuated to a vacuum pressure in the range of about 5 millitorr to 500 millitorr by the vacuum device of the gas analysis instrument 20. The reservoir valve 64 is then closed by the control device 65. Thus, the vacuum created within the reservoir chamber 44 is isolated from exterior pressure influence. Evacuation time for the reservoir chamber 44 is about 30 secs to 5 minutes. While the chamber 44 is being evacuated, a suitable required vacuum is created in the gas analysis instrument 20.

The test chamber valve 48 is opened by the control device 50 to apply the isolated vacuum in the reservoir chamber 44 to the test chamber 24 and to evacuate the test chamber 24. Thus, the isolated vacuum is applied to the article 12. The pressure which is established in the test chamber 24 is in the range of about 8 Torr to 43 Torr. If there are any leakage paths in the article 12, tracer gas in the article 12 escapes from the article 12 into the test chamber 24 because the pressure in the test chamber 24 becomes much lower than the pressure inside the article 12.

While the test chamber 24 is being evacuated by the isolated vacuum, a pressure differential exists between the test chamber 24 and the reservoir chamber 44. This pressure differential causes some gaseous contents, including any leakage of the tracer gas, present in the test chamber 24 to flow into the reservoir chamber 44. When the pressure in the test chamber 24 drops to a pressure in the range of about 8 Torr to 43 Torr, the test chamber valve 48 is closed by the control device 50. When the test chamber valve 48 is closed, the test chamber 24 is not further evacuated by the isolated vacuum in the reservoir chamber 44.

The presence of tracer gas in the reservoir chamber 44 indicates that the article 12 does not have seal integrity. The presence of the tracer gas in the reservoir chamber 44 may be determined by conveying the gaseous contents in the reservoir chamber 44, including any leaked tracer gas, to the gas analysis instrument 20 through the reservoir chamber conduit 58. To accomplish this, the reservoir valve 64 of the reservoir chamber conduit 58 is opened by the control device 65.

The gaseous contents in the reservoir chamber 44, including any leaked tracer gas present, are conveyed to the gas analysis instrument 20 through the reservoir chamber conduit 58 by further evacuation caused by the vacuum device (not shown) of the gas analysis instrument 20. The gas analysis instrument 20 detects the presence and measures the amount, if any, of the tracer gas. If a specific amount of tracer gas is detected, the article 12 lacks seal integrity. The gas analysis instrument 20 provides an output signal which is proportional to the quantity of the tracer gas conveyed from the reservoir chamber 44.

Alternatively, the presence of the tracer gas in the reservoir chamber 44 may be determined without excessive depletion of the captured gaseous contents of the reservoir chamber 44 by conveying the gaseous contents to the gas analysis instrument 20 through the reservoir restrictive conduit 72. To accomplish this, the reservoir capillary valve 78 is opened by manually actuating the adjustment device 79 to establish fluid flow between the reservoir chamber 44 and the gas analysis instrument 20 through the reservoir restrictive conduit 72. The reservoir valve 64 is maintained in its closed position. Some of the gaseous contents in the reservoir chamber 44, including any leaked tracer gas, flows through the reservoir restrictive conduit 72 to the gas analysis instrument 20. Detection of the tracer gas is performed by the gas analysis instrument 20.

Also, any amount of tracer gas in the test chamber 24 outside of the article 12 indicates that the article 12 does not have seal integrity. Thus, the presence of a leak in the article 12 may be determined by checking the gaseous contents in the test chamber 24 outside of the article 12. The gaseous contents in the test chamber 24 may be conveyed to the gas analysis instrument through the test chamber restrictive conduit 82. To accomplish this, the test chamber capillary valve 88 is opened by manually actuating the adjustment device 89 to establish fluid flow between the test chamber 24 and the gas analysis instrument 20. Some of the gaseous contents in the test chamber 24, including any tracer gas present, are conveyed through the test chamber restrictive conduit 82 to the gas analysis instrument 20. The gas analysis instrument 20 detects the presence of any tracer gas.

In another mode of operation, the leak detector apparatus 10 can be used to test for a leak in an article 12 over a prolonged period of time. The article 12 is placed in the test chamber 24 of the test container 16. The test chamber valve 48, the reservoir chamber valve 64, the reservoir capillary valve 78, the test chamber capillary valve 88, and the bleed valve 32 are placed in their respective closed positions.

The gas analysis instrument 20 is turned on and the reservoir valve 64 is opened such that vacuum is created in the reservoir chamber 44. The reservoir valve 64 is closed to isolate the vacuum. The test chamber valve 48 is opened to apply the isolated vacuum to the test chamber 24 and the article 12. The test chamber valve 48 is closed and a vacuum pressure is retained around the article 12. The vacuum pressure in the test chamber 24 can be adjusted by opening the bleed valve 32 to vent external atmosphere into the test chamber 24 while monitoring the vacuum gauge 28.

The vacuum pressure in the test chamber 24 can be maintained for a prolonged period of time and the article 12 will be exposed to the vacuum pressure during this prolonged period. Thus, the article 12 is "soaked" in a vacuum pressure to allow sufficient time for the tracer gas to seep out of any very small leak passage in the article 12. After the article 12 is "soaked" by the vacuum, the test chamber capillary valve 88 can be opened to establish a fluid flow toward the gas analysis instrument 20. Alternatively, the test chamber valve 48 and either the reservoir chamber valve 64 or the reservoir capillary valve 78 are opened to establish a fluid flow toward the gas analysis instrument 20.

The present invention prevents the possibility of loss of the tracer gas prior to the establishment of the proper operating condition of the gas analysis instrument. Specifically, the tracer gas is not vented to the atmosphere by the gas analysis instrument as the gas analysis instrument is starting up and begins to draw a vacuum.

After completion of the test on the article 12, the bleed valve 32 can be opened to permit the pressure in the test chamber 24 to return to atmospheric pressure. The tested article 12 is removed from the test chamber 24. After the test article 12 is removed, the test chamber 24 can be flooded with a purging gas to remove any of the leaked tracer gas. The purging gas may be directed into the test chamber 24 and permitted to exit through the bleed valve 32. The purging gas is either high purity nitrogen or dry air. The use of purging gas will help prevent detection of tracer gas which was leaked from a previous test article 12 and can improve accuracy of the test results provided by the gas analysis instrument 20.

Many articles of manufacture have a tracer gas sealed inside the article and can be tested for seal integrity with the present apparatus and method. Examples of such articles include inflators for vehicle occupant restraints, such as an air bags; sensors; fuel tanks; fuel systems; squibs; automotive transmissions; torque converters; electronic devices; and medical implants, such as pacemakers.

From the above description of the invention, those skilled in the art will perceive improvements, changes and modifications in the invention. Such improvements, changes and modifications within the skill of the art are intended to be covered by the appended claims.

I claim:

1. An apparatus for checking the seal integrity of an article having a tracer fluid contained within the article, said apparatus comprising:
   a test chamber for receiving the article;
   a reservoir chamber for retaining a vacuum pressure;

an analysis instrument for detecting a presence of the tracer fluid, said analysis instrument comprising a means for creating a vacuum in said reservoir chamber;

a first conduit coupled between said reservoir chamber and said analysis instrument;

a first valve in said first conduit which has an open position for permitting fluid communication between said reservoir chamber and said analysis instrument and for enabling a vacuum to be created in said reservoir chamber and a closed position for isolating said reservoir chamber from said analysis instrument after a vacuum is created in said reservoir chamber;

a second conduit coupled between said test chamber and said reservoir chamber; and a second valve in the second conduit which has a closed position for blocking fluid communication between said test chamber and said reservoir chamber to prevent a pressure change in said test chamber during creation of the vacuum in said reservoir chamber and an open position for enabling the vacuum from said evacuated reservoir chamber to be applied to the article in said test chamber to draw the tracer fluid out of the article through any leakage path in the article.

2. An apparatus as set forth in claim 1 wherein said gas analysis instrument is a mass spectrometer calibrated to detect the tracer fluid and wherein the tracer gas fluid is a gas which includes argon or helium.

3. An apparatus as set forth in claim 1 wherein said test chamber is defined by a test container and said test container is made of a material selected from the group consisting of a stainless steel alloy, an aluminum alloy, glass and the like.

4. The apparatus as set forth in claim 1 wherein said reservoir chamber is defined by a reservoir container and said reservoir container is made of a material selected from the group consisting of a stainless steel alloy, an aluminum alloy, glass and the like.

5. An apparatus as set forth in claim 1 wherein said first and second valves are capable of sealing a vacuum of about $10^{-11}$ Torr.

6. An apparatus as set forth in claim 1 further including a restrictive third conduit coupled between said test chamber and said analysis instrument and a capillary valve in said restrictive third conduit, said capillary valve having an open position for permitting conveyance of the fluid contents of said test chamber to said analysis instrument and a closed position for blocking fluid communication between said test chamber and said analysis instrument through said restrictive third conduit.

7. An apparatus as set forth in claim 6 wherein said restrictive third conduit has a restrictive cross-sectional flow area and said means for creating a vacuum has a capacity for causing the tracer fluid to flow through said restrictive third conduit at a rate of about at least 45 cc/minute and for maintaining the pressure at said analysis instrument at below 200 millitorr.

8. An apparatus as set forth in claim 1 further including a restrictive third conduit coupled between said reservoir chamber and said analysis instrument and a capillary valve in said restrictive third conduit, said capillary valve having an open position for permitting conveyance of the contents of said reservoir chamber to said analysis instrument and a closed position for blocking fluid communication between said reservoir chamber and said analysis instrument through said restrictive third conduit.

9. An apparatus as set forth in claim 8 wherein said restrictive third conduit has a restrictive cross-sectional flow area and said means for creating a vacuum has a capacity for causing the tracer fluid to flow through said restrictive third conduit at a rate of about at least 45 cc/minute and for maintaining the pressure of said analysis instrument at below 200 millitorr.

10. A method of checking seal integrity of an article having a tracer fluid contained within the article, said method comprising the steps of:

sealing the article within a first chamber to isolate the article;

creating a vacuum in a second chamber which is sealed from the first chamber such that the article is not subject to a pressure change during creation of the vacuum in the second chamber;

sealing the second chamber to retain the vacuum in the second chamber and to isolate the vacuum within the second chamber;

thereafter establishing fluid communication between the first and second chambers to apply the isolated vacuum in the second chamber to the article in the first chamber for drawing the tracer fluid out of the article through any leakage path in the article;

establishing a fluid flow of any tracer fluid drawn from the article toward an analysis instrument; and analyzing the fluid flow to determine the presence of the tracer fluid.

11. A method as set forth in claim 10, wherein said step of creating a vacuum includes opening a first valve in a conduit coupled between the second chamber and an analysis instrument and evacuating the second chamber by the analysis instrument, said step of sealing the second chamber includes closing the first valve in the conduit coupled between the evacuated second chamber and the analysis instrument to isolate the second chamber, said step of establishing fluid communication between the first and second chambers includes opening a second valve in a conduit coupled between the first chamber and the second chamber to draw the tracer fluid through any leakage path in the article into the second chamber, said method including the step of closing the second valve in the conduit coupled between the first chamber and the second chamber to isolate the first chamber from the second chamber after the vacuum is applied to the article, said step of establishing a fluid flow of any tracer fluid drawn from the article toward an analysis instrument includes opening the first valve of the conduit coupled between the second chamber and the analysis instrument to convey the contents of the second chamber including any leaked tracer fluid to the analysis instrument.

12. A method as set forth in claim 10 wherein said step of sealing the article within the first chamber includes sealing an air bag inflator, with helium or argon contained within the air bag inflator, in the first chamber.

13. A method as set forth in claim 10 wherein said step of analyzing the fluid flow to determine the presence of the tracer fluid includes directing the tracer fluid to a mass spectrometer.

14. A method as set forth in claim 10 wherein said step of creating a vacuum in the second chamber includes evacuating the second chamber to a pressure in the range of 5 millitorr to 500 millitorr.

15. A method as set forth in claim 10 wherein said step of applying the vacuum to the article in the first chamber includes establishing a pressure in the range of about 8 Torr to 43 Torr in the first chamber by opening a valve of a conduit coupled between the first chamber and the evacuated second chamber.

16. A method as set forth in claim 10, wherein said step of creating a vacuum includes opening a first valve in a first conduit coupled between the second chamber and an analysis instrument and evacuating the second chamber by the analysis instrument, said step of sealing the second chamber includes closing the first valve in the conduit coupled between the evacuated second chamber and the analysis instrument to isolate the second chamber from the analysis instrument, said step of establishing fluid communication between the first and second chambers includes opening a second valve in a conduit coupled between the first chamber and the second chamber to draw the tracer fluid through any leakage path in the article into the second chamber, said method including the step of closing the second valve in the conduit coupled between the first chamber and the second chamber to isolate the first chamber from the second chamber after the vacuum is applied to the article, said step of establishing a fluid flow of any tracer fluid drawn from the article toward an analysis instrument includes opening a third valve in a second conduit coupled between the second chamber and the analysis instrument to convey the contents of the second chamber including any leaked tracer fluid to the analysis instrument.

17. A method as set forth in claim 10, wherein said step of creating a vacuum includes opening a first valve in a conduit coupled between the second chamber and an analysis instrument and evacuating the second chamber by the analysis instrument, said step of sealing the second chamber includes closing the first valve in the conduit coupled between the evacuated second chamber and the analysis instrument to isolate the second chamber from the analysis instrument, said step of establishing fluid communication between the first and second chambers includes opening a second valve in a conduit coupled between the first chamber and the second chamber to draw the tracer fluid through any leakage path in the article into the isolated vacuum, said method including the step of closing the second valve in the conduit coupled between the first chamber and the second chamber to isolate the first chamber from the second chamber after the vacuum is applied to the article, said step of establishing a fluid flow of any tracer fluid drawn from the article toward an analysis instrument includes opening a third valve in a conduit coupled between the first chamber and the analysis instrument to convey the contents of the first chamber, including leaked tracer fluid, to the analysis instrument.

18. A method as set forth in claim 10, wherein the isolated vacuum is applied to the article for a prolonged period of time and the step of establishing a fluid flow of any tracer fluid drawn from the article toward and analysis instrument occurs after the prolonged period.

* * * * *

UNITED STATES PATENT AND TRADEMARK OFFICE
CERTIFICATE OF CORRECTION

PATENT NO. : 5,375,456
DATED : December 27, 1994
INVENTOR(S) : William Burns

It is certified that error appears in the above-indentified patent and that said Letters Patent is hereby corrected as shown below:

Column 9, line 35, after "glass" delete --and the like--.

Column 9, line 40, after "glass" delete --and the like--.

Signed and Sealed this

Eleventh Day of July, 1995

Attest:

BRUCE LEHMAN

*Attesting Officer*      *Commissioner of Patents and Trademarks*